United States Patent Office

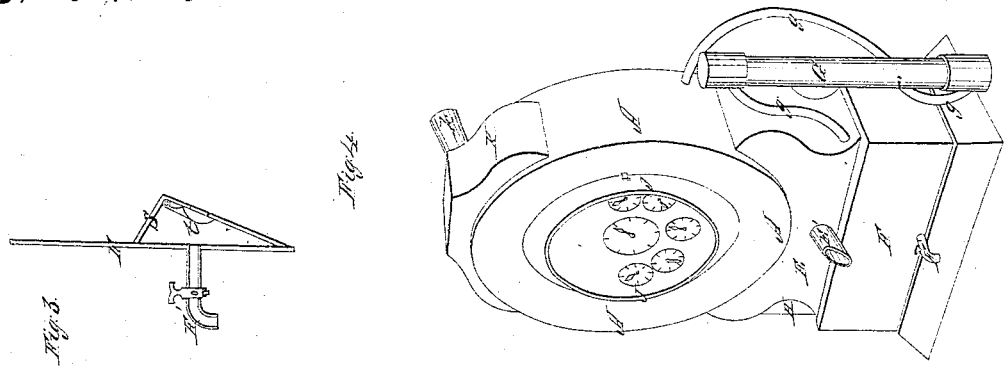
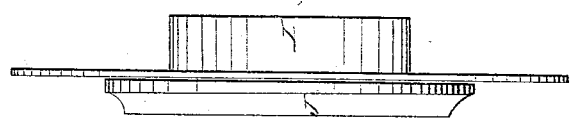
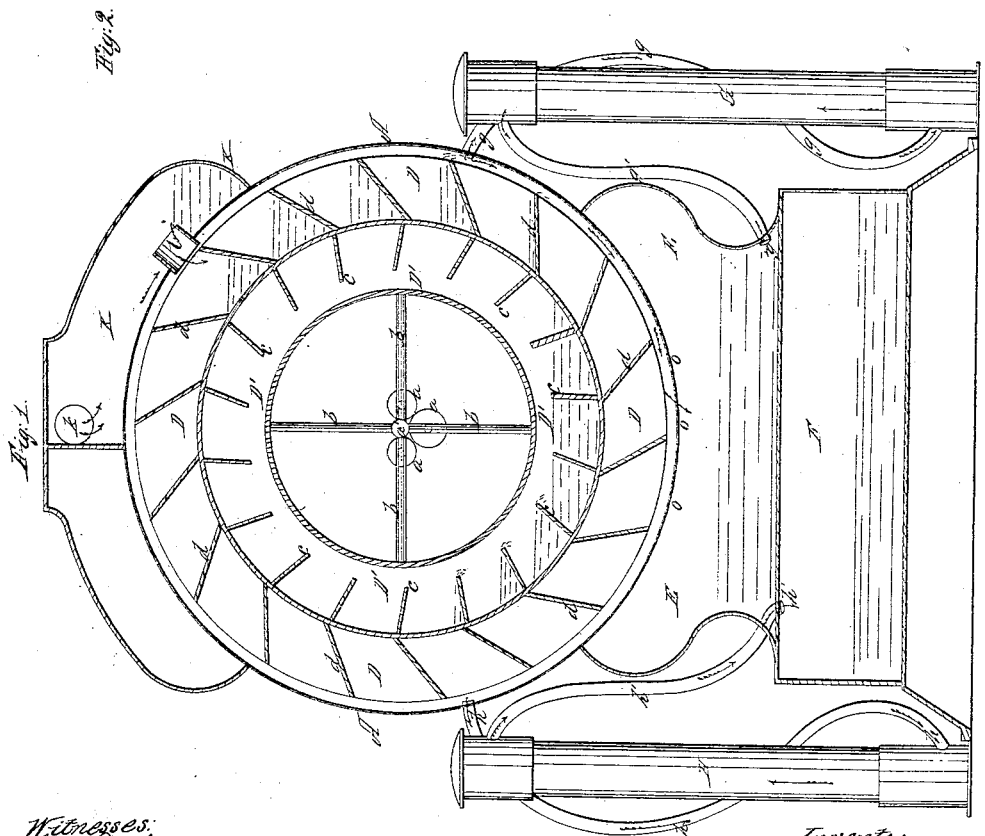

LOUIS BRAUER, OF MEMPHIS, TENNESSEE.

*Letters Patent No. 65.720, dated June 11, 1867.*

---

IMPROVEMENT IN HYDRAULIC WEIGHING APPARATUS.

---

The Schedule referred to in these Letters Patent and making part of the same.

---

TO ALL WHOM IT MAY CONCERN:

Be it known that I, LOUIS BRAUER, of Memphis, in the county of Shelby, and State of Tennessee, have invented a Rotary Endless Scale for Fluids; and I do hereby declare that the following is a full, clear, and exact description thereof, reference being had to the accompanying drawings making part of this specification, in which—

Figure 1 is a vertical section through my improved apparatus for weighing fluids, showing the construction of the weighing wheel and the interior arrangement of the case for enclosing it.

Figure 2 is a side view of the front or face plate of the wheel case.

Figure 3 is a sectional view in detail of the front part of the lowermost chamber of the apparatus, showing the draw-off cock, and also a valve for preventing the introduction of a fluid into said chamber.

Figure 4 is a perspective view of the apparatus complete.

Similar letters of reference indicate corresponding parts in the several figures.

This invention is designed as a means for weighing all kinds of fluids, such, for instance, as wines and other kinds of liquors of high and low proof, water, milk, and also substances which will flow like liquids. It consists mainly in a rotary scale which is provided with a continuously acting counterbalancing weight on one side of its axis, and with buckets or chambers upon its circumference, so that when a fluid is caused to flow upon said wheel this wheel will be slowly turned, thus constituting a continuously rotating scale which will, by the aid of suitable mechanism, record and indicate the weight of the quantity of fluid passed through the apparatus, as will be hereinafter described.

The invention also consists in combining a recording or registering mechanism with a continuously rotating scale in such a manner that said mechanism shall be actuated directly from the axis of said scale, and be enclosed within a case which will expose its dials without allowing them to be tampered with, as will be hereinafter explained.

It also consists in mounting a continuously rotating scale, which is adapted for weighing fluids and registering the quantity passed through the apparatus, upon anti-friction rolling bearings, which will allow of the turning of said wheel by a regular continuous movement, and prevent undue friction and consequent wearing of the axle thereof, as will be hereinafter explained.

The invention also consists in making provision for causing the fluid which is to be weighed to flow upon the rotary scale in a regular stream without undue impact, thereby preventing all irregularity in the working of the scale by slow and fast currents, as will be hereinafter described.

The invention also consists in providing the case containing the rotary scale with a drop-chamber below it for receiving the fluid as rapidly as it is weighed and allowed to escape from the said scale, thereby preventing the fluid from reacting upon and causing an irregular movement of the weighing and registering mechanism, as will be hereinafter described.

The invention consists, further, in the arrangement of a chamber for receiving samples of the fluid passed through the weighing mechanism, below the drop-chamber, and in providing said chamber with suitable communications with the rotary scale case, and also with suitable means for allowing samples to be drawn from it, as will be hereinafter described.

The invention also consists in combining with an apparatus, operating upon the principles hereinafter to be explained, one or more transparent cylinders, which communicate with the apparatus in such manner as to receive samples of the fluid which is weighed, and also to receive hydrometers for indicating the strength of such fluid, as will be hereinafter explained.

To enable others skilled in the art to understand my invention, I will describe one practical mode of carrying it into effect.

In the accompanying drawings, A represents a circular box or case, which may be made of any suitable capacity, and which is adapted for containing a rotating scale, D, for weighing fluids passed through this case, as will be hereinafter explained. This case is mounted upon and suitably secured to a drop-box, E, into which the fluid flows, after being weighed, through the opening O, which is made through the bottom of said case. This receptacle E is provided with one or more outlets, E', and it should be made of such capacity, with reference to the capacity of the weighing wheel for receiving fluid, that the weighed fluid will never rise so high in this receptacle as to obstruct the rotation of said wheel. Below this drop or outlet-chamber E I have arranged a chamber, F, for receiving samples of the fluid which is being weighed from the case A. This chamber is provided with a draw-off cock, F', and also with a valve, t, which latter is applied to a divisional box, S, shown in fig. 3, so as to open outward and allow fluid to be drawn from the chamber F, but prevent the introduction of anything into this chamber through the cock F'. As the chamber F is designed exclusively for containing samples of the fluid which has been weighed and indicated upon the recording dials of the apparatus, provision will be made for locking the plug of the draw-off cock F', so that no person but the inspector can have access to said chamber. The manner of getting the fluid into chamber F is through a transparent case or cylinder, H, which is located upon one side of the apparatus, as shown in fig. 1, and adapted for containing an hydrometer for indicating the strength of the contained fluid. The lower end of this cylinder H communicates with the interior of the wheel case A so as to receive fluid in very small quantities therefrom, and the upper end of this cylinder communicates with the chamber F through an overflow pipe, h'. The hydrometer chamber H will exhibit the specific gravity of the fluid which has passed through the apparatus, and the draw-off cock will allow of the inspection of such fluid by the proper person. On the opposite side of the apparatus is an hydrometer chamber or cylinder, G, adapted for containing any suitable form of hydrometer. This is designed especially for the person possessing the apparatus for enabling him to determine at a glance the strength of the fluid which is passing through the apparatus. The cylinder G communicates with the interior of the wheel case A by means of a pipe, g, and with the receiving chamber E by means of the overflow pipe g', as shown in fig. 1. The fluid which enters the apparatus through the pipe k is received within a chamber, K, at the lower part thereof; it thence rises and flows over the short tube l into the buckets d d, which are upon the circumference of the wheel D, and causes this wheel to rotate slowly about its axis in the direction of the arrow in fig. 1. The mode which I have shown of conducting the fluid from the pipe k upon the circumference of the weighing wheel D will prevent the fluid from materially affecting the revolution of this wheel by impact should the current be stronger at one time than another. By the arrangement shown the momentum or force of the current will be broken or greatly modified before the fluid flows upon the wheel. This wheel D contains an annular air-tight chamber, D', which is concentric to the axis of the shaft a', and which is provided with a suitable number of lifting plates, c, applied so as to carry up a liquid or other suitable flowing material a certain distance and then discharge it again. The substance which is put into the chamber D' to be acted upon by the plates c therein is designed to serve as a continuous counter-weight to the fluid which is conducted into the weighing buckets d upon the circumference of the wheel. This counter-weight should be adjusted and graduated according to the weight of fluid which it is desired should move the wheel about its axis when applied in the buckets on one side of said axis. The axle a' of the weighing wheel D is supported at both ends by means of anti-friction wheels a a a, one of which sustains said shaft upon its highest point, while the other two keep the shaft in place. These rollers will prevent any undue friction on the shaft a', and consequently allow the wheel D to rotate regularly and smoothly. The front end of the axle a' is connected by suitable means to a train of wheels which should be arranged within the case I upon the back of the face plate of the cylindrical wheel case A, as shown in fig. 2. The centre or axis of the case or box I coincides with the axis of the shaft a' of the weighing wheel D, so that this shaft can be connected directly with the registering wheel work, thereby greatly simplifying the apparatus and rendering it very compact. In front of the cylindrical case I, and upon the front side of the face plate of the case A, is a dial plate for registering the quantity of liquid or fluid passed through the apparatus, in pounds or fractions of pounds. And in front of this dial plate is a case, J, having a glass or other transparent face through which the dial plate can be seen but not tampered with.

I do not confine my invention to the use of any particular construction of registering mechanism, and therefore I have not represented such mechanism in the drawings. I prefer to have whatever registering devices may be employed applied within the case I, as described, and connected directly with the shaft of the weighing wheel.

Having described my invention, what I claim as new, and desire to secure by Letters Patent, is—

1. A wheel which is provided with buckets or chambers upon its circumference, and also with a continuously acting counterbalance, and which is adapted for weighing, substantially as described.

2. The combination of a registering or recording mechanism, with a continuously rotating weighing apparatus, operating substantially as described.

3. Sustaining a rotary weighing wheel which is provided with a continuously acting counterbalance upon anti-friction rollers at both ends of its axle, and connecting such wheel directly to registering mechanism, substantially as described.

4. The case I, adapted for receiving the registering mechanism when it extends from the face plate of the wheel case A into the space surrounding the centre of the weighing wheel, all constructed and arranged substantially as described.

5. The strap K and overflow l, substantially as described and shown, for conducting the fluid to be weighed upon the weighing wheel and into the buckets thereof, substantially as described.

6. The arrangement of the receiving chamber below the wheel case A, substantially as and for the purpose described.

7. The sample chamber F, with an outlet, F', and a valve, t, substantially as and for the purposes described.

8. The hydrometer receiver or receivers for the purpose specified.

LOUIS BRAUER.

Witnesses:
 JOHN KINGDON,
 EDW. SCHAFER.